US008395711B2

(12) United States Patent
Oz et al.

(10) Patent No.: US 8,395,711 B2
(45) Date of Patent: Mar. 12, 2013

(54) METHOD AND SYSTEM FOR FUSING VIDEO STREAMS

(75) Inventors: Gal Oz, Kfar Saba (IL); Danielle Shor, Ramat Gan (IL); Michael Tamir, Tel Aviv (IL); Michael Birnboim, Holon (IL)

(73) Assignee: Sportvu Ltd., Kfar Saba (IL)

( * ) Notice: Subject to any disclaimer, the term of this patent is extended or adjusted under 35 U.S.C. 154(b) by 915 days.

(21) Appl. No.: 12/499,814

(22) Filed: Jul. 9, 2009

(65) Prior Publication Data

US 2010/0060793 A1 Mar. 11, 2010

Related U.S. Application Data

(60) Provisional application No. 61/094,913, filed on Sep. 7, 2008.

(51) Int. Cl.
*G06F 13/00* (2006.01)
*G06F 3/00* (2006.01)
*H04N 5/445* (2011.01)
*H04N 5/222* (2006.01)

(52) U.S. Cl. .......................................... 348/722; 725/59
(58) Field of Classification Search ............... 348/722; 725/40–43, 59
See application file for complete search history.

(56) References Cited

U.S. PATENT DOCUMENTS

2003/0051255 A1 3/2003 Bulman et al.
2003/0123855 A1* 7/2003 Okada et al. .................... 386/98
2007/0038612 A1 2/2007 Sull et al.
2007/0207782 A1 9/2007 Tran

OTHER PUBLICATIONS

M. A. O. Vasilescu and D. Terzopoulos "TensorTextures: Multilinear Image-Based Rendering" ACM Transactions on Graphics, 23, 2004, pp. 336-342.

* cited by examiner

*Primary Examiner* — Hunter B Lonsberry
(74) *Attorney, Agent, or Firm* — Mark M. Friedman

(57) ABSTRACT

It is provided a method for converting video streams capturing a scene to video streams fitting a viewpoint configuration. The video streams are provided by video cameras, and the method includes receiving parameters associated with the viewpoint configuration, and converting video streams of the scene as captured by the video cameras to video streams fitting the viewpoint configuration. The viewpoint configuration may be a dynamic viewpoint configuration determined by a joystick module. The converting may be done using a three dimensional method, and includes separating objects of the scene from other portions of the scene. The method may includes integrating the scene into the video stream of a certain scene associated with the viewpoint configuration. Sometimes the viewpoint configuration includes a varying zoom and the converting is done using one of several methods, transition between adjacent video cameras having different zoom values, real zooming of a video camera having a motorized zoom, and digital zooming in of video streams. The converting may be done on video streams which have been captured the scene in advance before commencing the converting.

36 Claims, 14 Drawing Sheets

METHOD AND SYSTEM FOR FUSING VIDEO STREAMS

CROSS-REFERENCE TO RELATED APPLICATIONS

This application claims the benefit of U.S. provisional application Ser. No. 61/094,913 filed Sep. 7, 2008 by Gal Oz, Danielle Shor, Michael Tamir, and Michael Birnboim, who are inventors on the present application.

BACKGROUND OF THE INVENTION

1. Field of the Invention

The invention is in the field of live television studio production and more particularly, embedding real video of remote objects into the footage generated at the studio.

2. Description of Related Art

Currently, in live interviews with a remote participant the remote video is inserted into a separate window on the frame using standard studio device known as Digital Video Effects (DVE) device. Thus, the remote participant seems to be in a separate place. However, it is desired to integrate remote objects into the real studio such that they are apparently present in the studio. Such integration can either be done seamlessly for a realistic look or intentionally highlighted or manipulated to produce a virtual look such as in a "star wars hologram". To this aim, the remote object should acquire the same changes that occur to objects present in the studio when the studio camera is moving, panning, tilting or zooming while capturing the studio scene. The studio camera may have up to seven degrees of freedom—translation (x,y,z), rotation (pan, tilt, roll) and zoom. A change in the value of each one of these parameters immediately entails a perspective or another change in the appearance of studio objects on the video. The remote object image should change accordingly as if the remote object was a real object present in the studio. The video image of the remote object, updated every frame, should thus be achieved in real time for any possible pose of the studio camera and with resolution high enough to afford close-up situations.

In the prior art, Orad Hi-Tech Systems used a method to seamlessly embed remote scene into a local one, relied on a remote robotic camera slaved to the studio camera in all degrees of freedom. Thus, any change in the location, pan, tilt, roll angles and zoom value in the local camera entails the same change in the remote camera; remote objects will thus automatically acquire the same perspective of the local ones. The problem with this method relates to the long motion time associated with the robotic camera's translational movement, rotations and zooming processes. The resulted lag imposes unacceptable delays that are prohibitive for live interviews, as well as too many other types of live television studio programs.

It is an objective of the present invention to embed remote objects and scenes into the studio footage in real time and with a short latency allowing for live interview and other close interactions between local and remote objects.

BRIEF SUMMARY OF THE INVENTION

It is provided for the first time a system for embedding into a video production of a first scene an object captured in a second scene. Video streams which capture the first scene are provided by image providers, each image provider is associated with a viewpoint configuration. Video streams which capture the second scene are provided by video cameras. The system includes a viewpoint synthesizer, means for separating at least a portion of the second scene from other portions of the second scene, and means for integrating the at least a portion of the second scene into the video stream of the first scene. The viewpoint synthesizer is adapted for receiving parameters associated with the viewpoint configuration of an image provider, and for converting video streams of the second scene as captured by the video cameras to video streams fitting the viewpoint configuration of the image provider.

The image providers may be studio cameras, each associated with a dynamic viewpoint configuration, video cameras mounted fixedly, or providers of computer graphics scene. The studio camera may include indicators indicating quality of the conversion of video streams capturing the second scene to video streams fitting the viewpoint configuration of the studio camera.

A joystick module may furnish both a provider of computer graphics scene and a viewpoint synthesizer parameters associated with a viewpoint configuration. Thus, the viewpoint synthesizer converts video streams of the second scene as captured by at least one of the video cameras to video streams fitting the viewpoint configuration of the computer graphics scene.

Also, the image provider may be a virtual studio camera which includes a video camera and a calculator of parameters associated with the viewpoint configuration. The calculation is based on spatial parameters associated with the first scene which have been obtained in advance.

In some embodiments, the second scene is set for facilitating separation of an object located in the second scene from other portions of the second scene using chroma keying or luma keying. Keying parameters may have different values for each of the video cameras.

In some embodiments, two or more video cameras capturing the second scene are arranged for capturing video streams for embedment in video streams captured by certain image provider. Thus, the video cameras capturing the second scene are mapped to the image providers capturing the first scene.

The viewpoint configuration of an image provider may be defined by parameters associated with degree of freedoms, three translation degrees, three rotation degrees and a zoom degree.

In some embodiments, video streams from video camera capturing the second scene are provided via a communication channel. The system may include means for synchronizing signal streams associated with the first scene with signal streams associated with the second scene. The signal streams may be either audio or video streams. The synchronizing may ensure a smooth and continuous display of audio and video signals associated with events occurring substantially simultaneously in distant locations.

It is provided for the first time a method for converting video streams capturing a scene to video streams fitting a viewpoint configuration. The video streams are provided by video cameras, and the method includes receiving parameters associated with the viewpoint configuration, and converting video streams of the scene as captured by the video cameras to video streams fitting the viewpoint configuration.

The viewpoint configuration may be a dynamic viewpoint configuration determined by a joystick module.

In some embodiments the method includes capturing a substantially frozen image of an object in the scene and presenting the object from two or more viewpoints of different viewing angle.

The video cameras may be mounted to a rig which may be a portable rig. The scene may be a sport arena.

In some embodiments, the converting is done using a billboard technique, a morphing technique or using three dimensional methods.

In some embodiments, the method includes separating at least one object of the scene from other portions of the scene. The separation may be made on the video streams capturing the scene, and then the converting is performed on the separated object only, saving the converting of the other portions. The separating may be made also on the converted video streams. Moreover, the separating may include removal of pictures of video cameras disposed proximate to the object.

In some embodiments, the method further includes the step of integrating the scene into the video stream of a certain scene associated with the viewpoint configuration. Video streams capturing additional scenes may be provided by video cameras, and the method may include converting video streams of the additional scenes to video streams fitting the viewpoint configuration, and integrating portions of each of the additional scenes with the video stream of the certain scene.

Sometimes, the viewpoint configuration includes a varying zoom and the converting is done using one of several methods, transition between adjacent video cameras having different zoom values, real zooming of a video camera having a motorized zoom, and digital zooming in of video streams. For such digital zooming sufficient initial resolution may be ensured using a video camera of high enough resolution. Alternatively, high initial resolution may be ensured by rotating a video camera by substantially right angle around optical axis to have a number of pixels in the vertical direction larger than a number of pixels in the horizontal direction.

In some embodiments, the converting is done on video streams which have been captured the second scene in advance before commencing the converting. The video streams captured in advance are stored for later offline use in the converting step.

The method may include synchronizing audio streams associated with the scene with video stream associated with the scene, to compensate for the video processing or for any other delay.

It is provided for the first time a method for embedding into a video production of a first scene objects captured in a second scene. The video streams capturing the first scene are provided by image providers associated with viewpoint configurations. Video streams capturing the second scene being provided by video cameras. The method includes converting video streams of the second scene to video streams fitting the viewpoint configuration of one of the image providers, and integrating portions of the second scene captured in the converted video stream with portions of the first scene. Thus, the method presents portions of the second scene captured in the converted video stream and objects thereof as integral part of the first scene.

The method may include providing video streams from video camera capturing the second scene via communication channels, and synchronizing signal streams associated with the first scene with signal streams associated with the second scene.

In some embodiments, the method includes providing varying parameters indicating dynamic viewpoint configurations of the image providers.

In some embodiments, the integrating of the first and second scenes includes application of digital video effects.

BRIEF DESCRIPTION OF THE DRAWINGS

The subject matter regarded as the invention is particularly pointed out and distinctly claimed in the concluding portion of the specification. The invention, however, both as to system organization and method of operation, together with features and advantages thereof, may best be understood by reference to the following detailed description when read with the accompanied drawings in which:

DETAILED DESCRIPTION OF THE INVENTION

Figure 1:
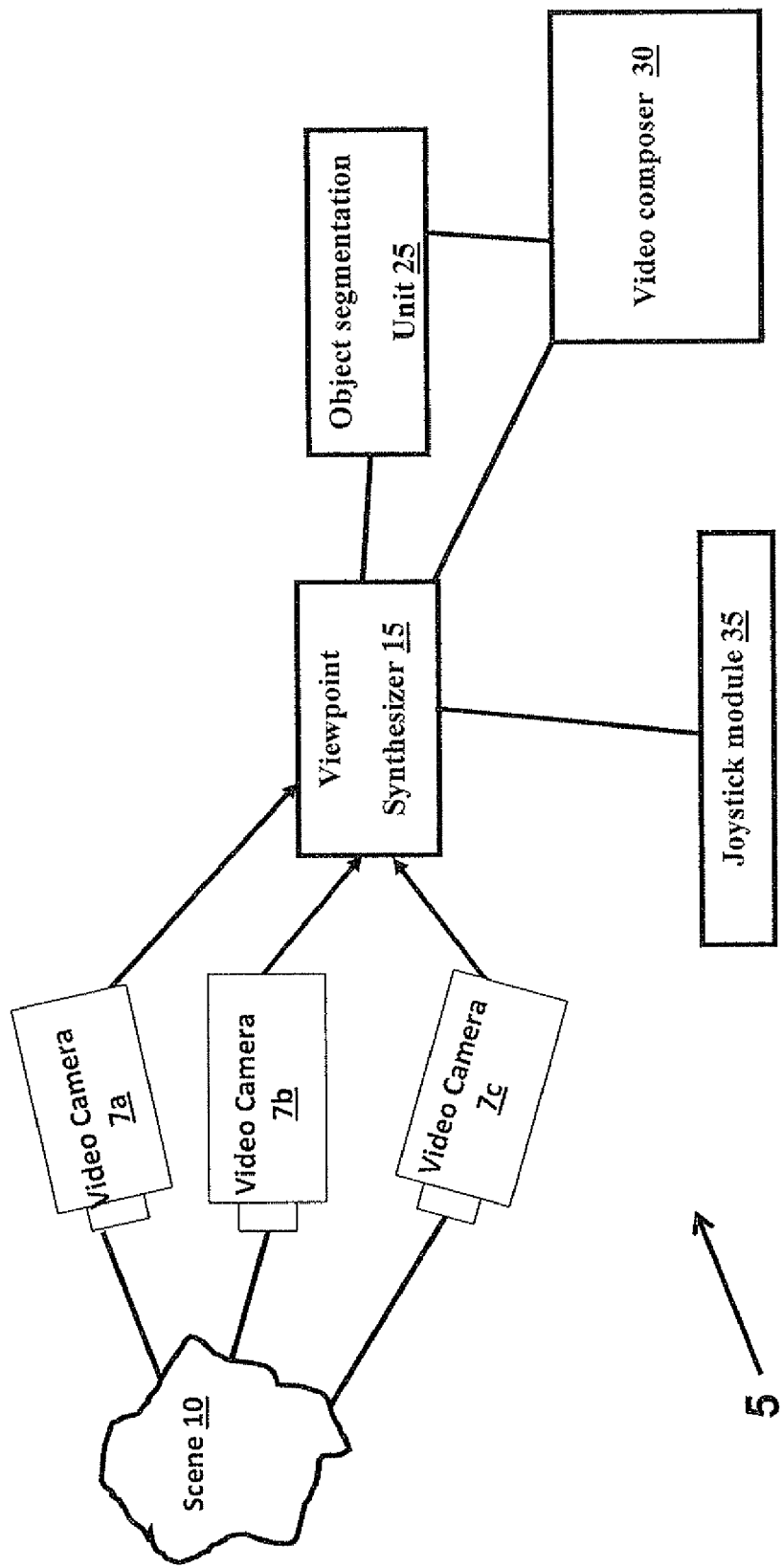
FIG. 1 is a block diagram of a system for converting video streams captured by video cameras to video stream associated with a viewpoint configuration.

The present invention will now be described in terms of specific example embodiments. It is to be understood that the invention is not limited to the example embodiments disclosed. It should also be understood that not every feature of the methods and systems handling the described device is necessary to implement the invention as claimed in any particular one of the appended claims. Various elements and features of devices are described to fully enable the invention. It should also be understood that throughout this disclosure, where a method is shown or described, the steps of the method may be performed in any order or simultaneously, unless it is clear from the context that one step depends on another being performed first.

Before explaining several embodiments of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Unless otherwise defined, all technical and scientific terms used herein have the same meaning as commonly understood by one of ordinary skill in the art to which this invention belongs. The systems, methods, and examples provided herein are illustrative only and not intended to be limiting.

In the description and claims of the present application, each of the verbs "comprise", "include" and "have", and conjugates thereof, are used to indicate that the object or objects of the verb are not necessarily a complete listing of members, components, elements or parts of the subject or subjects of the verb.

Definitions

Video Camera

A camera used for capturing a moving scene. A video camera may be static, standing on a tripod for example, or held by an operator/photographer/lensman. Also, it may have no zooming capability, several zooming states or a motorized continuous zooming capability.

Viewpoint Configuration

Viewpoint is a place from which something is viewed. In the context of capturing a scene or an object using a camera, one may use viewpoint to include also the distance and/or zoom factor used in the capturing. Viewpoint configuration stands for a set of data or parameters defining the viewpoint. The set may include the location (x,y,z), direction(pan, tilt, roll), zoom factor set on the camera, etc.

Studio Camera

Studio camera is a video camera used in a in a studio setting to conveniently and stably move from one viewpoint to another one. Usually, it has integrated or external sensors or controls which measure and sense the parameters of its viewpoint configuration.

Image Interpolation

Image interpolation is used to synthesize an image bridging two images A and B. Here are three exemplary techniques used for image interpolation:

1. Bilboard Technique

One takes an object from initial image A and rotate it so that it continuously faces the direction of view corresponding to the intermediate state between images A and B. For example, suppose that the object is a human face, then it is staring at the viewer all the time.

2. Morphing Technique

In the morphing technique, an initial image A is being morphed continuously to a final image B. For that sake, one finds a set of matching points of the two images. In the case of a face, for example, the matching points may be the right eye corner, the left mouth corner, etc. Using the matching points, the images are divided to a variety of matching areal pieces. In one example, the pieces are triangles and the matching points are the corresponding triangle vertexes. The matching initial and final pieces are averaged according to a weighting parameter which changes continuously.

3. Three Dimensional Method

One finds matching points in several images. Based on known viewpoint configurations associated with the images, one calculates the location of the matching points in space, and builds a three-dimensional model of an object. Consequently, one may synthesize the desired image as should be captured from a certain intermediate viewpoint configuration by projecting the three dimensional object model on a virtual camera having the certain viewpoint configuration.

Joystick Module

A joystick module is an interface module which enables an operator to change a viewpoint configuration in a friendly and natural way. In one example, the joystick module may be a fixed point on a computer display and a cursor movable by a mouse. The direction of a line connecting the cursor with the circle center determines the viewing direction. The distance to the center flips between determining a zooming factor and determining viewpoint height above ground. A joystick module may be also an actual joystick as used in games, a list of coordinates, or a script.

Chroma Keying

Chroma key is a technique for mixing two images or frames together, in which a color (or a small color range) from one image is removed (or made transparent), revealing another image behind it. The object is photographed against a background consisting of a single color or a relatively narrow range of colors, usually blue or green. The portions of the video which match the preselected color are considered background and made transparent while the other pixels represent the foreground object of interest.

Luma Keying

The Luma Key effect keys out all the regions of a layer with a specified luminance or brightness.

Digital Video Effects

Digital video effects (VDEs) are visual effects created in the computer that provide interesting transitions from one scene to another rather than just switching frames. VDEs include fading or dissolving the frame, wiping one frame over another and flipping the frame.

Using the definitions, several exemplary embodiments are described in FIGS. 1-13, as follows.

A Stand Alone Embodiment (FIGS. 1, 2, 3)

A stand alone embodiment of the present disclosure is described in FIG. 1, which shows a system 5 including a set of video cameras 7a, 7b and 7c capturing a scene 10, a viewpoint synthesizer 15, an object segmentation unit 25 and a video composer 30. The object segmentation unit 25 and the video composer 30 may be included in a single device as shown below. The synthesizer 15 receives parameters associated with a viewpoint configuration, and video streams of scene 10 from video cameras 7a, 7b and 7c. Then, it converts those video streams to video streams fitting the viewpoint configuration. The viewpoint configuration may be a dynamic viewpoint configuration determined by a joystick module 35.

Figure 2B:
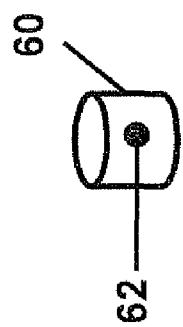
FIG. 2b shows a front view of a frozen scene.
Figure 2C:
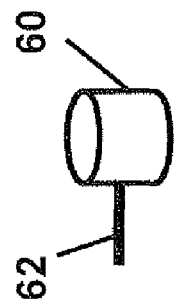
FIG. 2c shows a side view of the frozen scene.
Figure 2A:
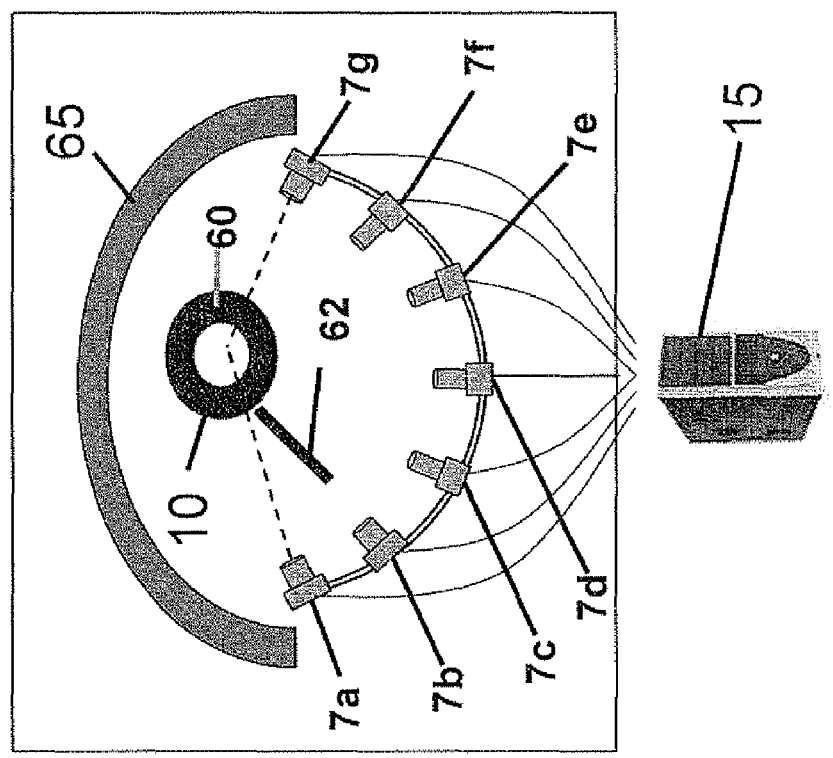
FIG. 2a illustrates a set of video cameras on a rig for capturing a scene.

An actual layout of a set of video cameras 7a,7b,7c,7d,7e, 7f, and 7g is shown in FIG. 2a whereas the cameras are mounted on a common rig surrounding scene 10. In scene 10, there are for example a fixed cylinder 60 and a rod 62 moving relative to cylinder 60. The arc 65 behind scene 10 may be covered by a green curtain used for chroma keying or covered by a white curtain strongly illuminated for luma keying The keying is used by the object segmentation unit 25 to separate cylinder 60 and rod 62 from background and to enable the video composer 30 to install the objects 60 and 62 on other background. The keying parameters may have different values for each of the video cameras.

Referring now to the converting task of the synthesizer 15, suppose that at time $t_1$ the viewpoint configuration corresponds to the viewpoint of camera 7d, and at time $t_2$ the viewpoint configuration is in a state in between that of camera 7d and that of camera 7e, and finally it arrives at time $t_3$ to the viewpoint of camera 7e. Such a dynamic viewpoint configuration change is dictated by an operator or director using the joystick module 35 or by other means. Of all the video streams it gets from the video cameras 7a to 7g, at time $t_1$, the viewpoint synthesizer 15 picks up the images from camera 7d. Similarly, at time $t_3$ it picks up the images from camera 7e. However, for time $t_2$ the synthesizer has a more challenging task, to convert the video streams it gets from both camera 7d and from camera 7e to video streams fitting the viewpoint configuration at time $t_2$. For that sake, the synthesizer may fuse images from camera 7d with images from camera 7e using one of the three interpolation methods described in the previous section, the billboard technique, the morphing technique or the three dimensional method.

Rather than using video streams which follow events occurring in scene 10, the system 5 may be used for a display of a time frozen object from a variety of directions. Suppose that at certain time $t_4$ objects 60 and 62 are captured momentarily with rod 62 vertically extending from the middle of the cylinder 60, as shown in FIG. 2a. Once a command is issued to the viewpoint synthesizer 15 to show that momentarily state from all directions, the synthesizer 15 saves the images it has got from all cameras at time $t_4$, and display the images continuously starting with the image of camera 7a, continuing with the image from camera 7b, and so on until it displays the image of camera 7g. The images obtained from camera 7c and camera 7g, respectively, are shown in FIG. 2b and FIG. 2c. For slow surrounding motion of scene 10, the synthesizer 15 adds intermediate images by conversion of images from neighboring cameras to an image fitting the intermediate viewpoint configurations.

The cameras 7a to 7g of FIG. 2a span an angle of about 135° around scene 10. A larger span angle may be used for capturing some scenes, sport arenas for example. In sport arena several groups of video cameras may be used, each mounted on a separate rig.

Figure 3A:
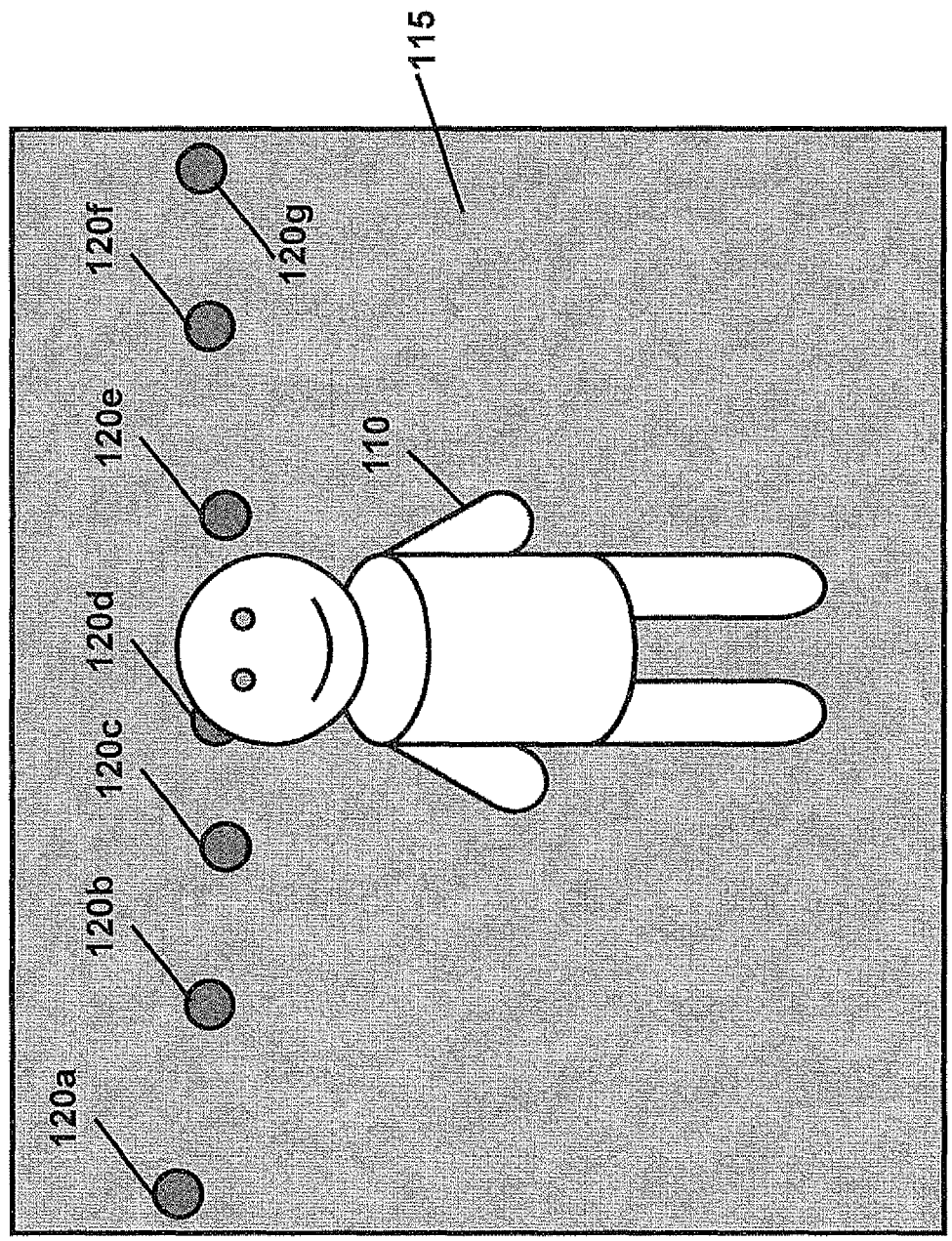
FIG. 3a depicts an object captured by encircling set of video cameras having color background for chroma keying.
Figure 3B:
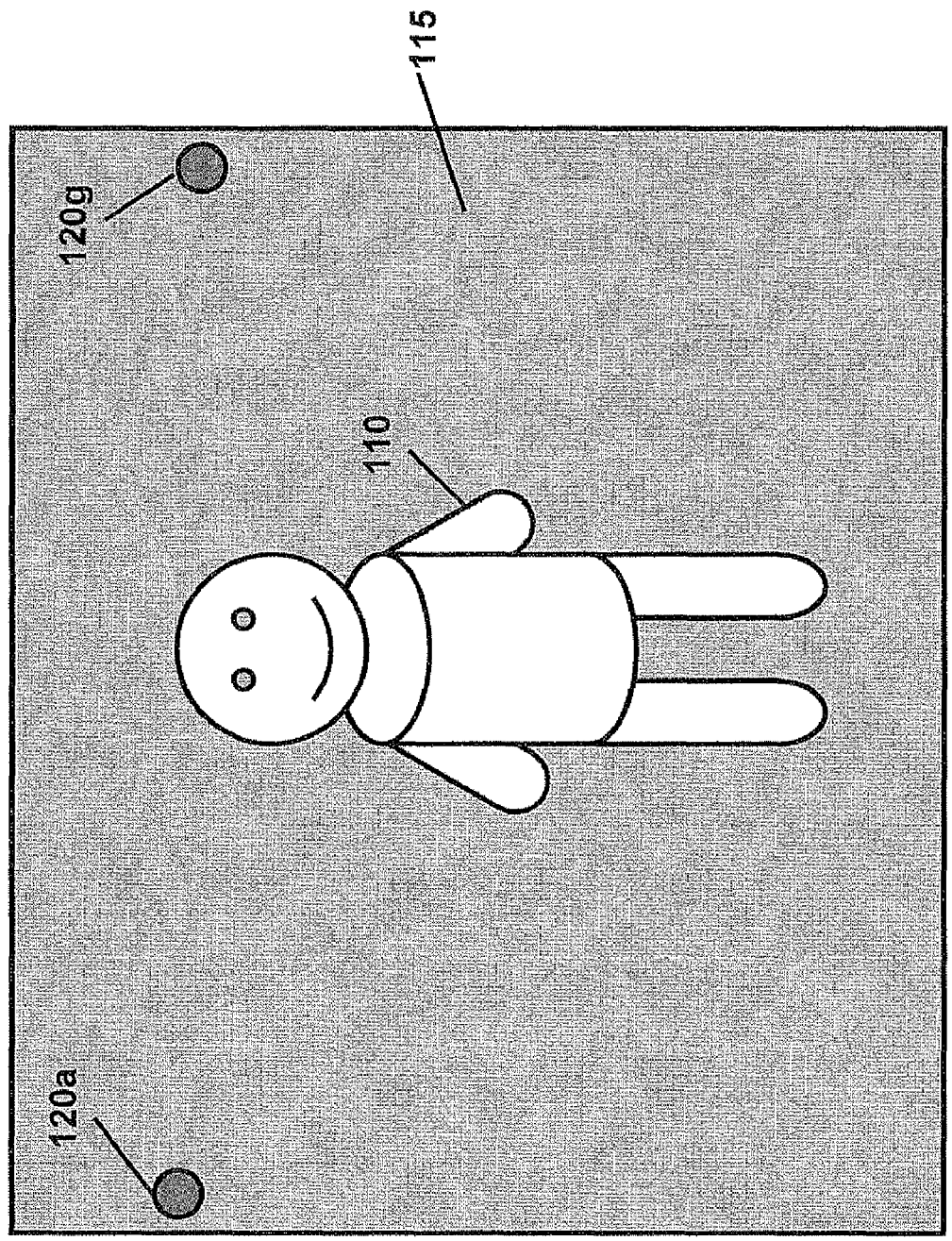
FIG. 3b exhibits the removal of the pictures of several cameras located proximate to the object.

In a studio example, shown in FIG. 3a, a human object 110 is encircled by video cameras spanning 360° angle. Object 110 is captured on a background 115 which may be a green curtain for chroma keying. However, not only the desired object 110 is captured but also the pictures of video cameras 120a, 120b, 120c, 120d, 120e, 120f, and 120g mounted behind object 110. Thus, object segmentation unit 25 is configured to separate object 110 from both green curtain background 115 and the pictures of cameras 120b, 120c, 120d, 120e, and 120f which appear in an interfering proximity to object 110. The result removal of the interfering pictures is shown in FIG. 3b.

Figure 4:
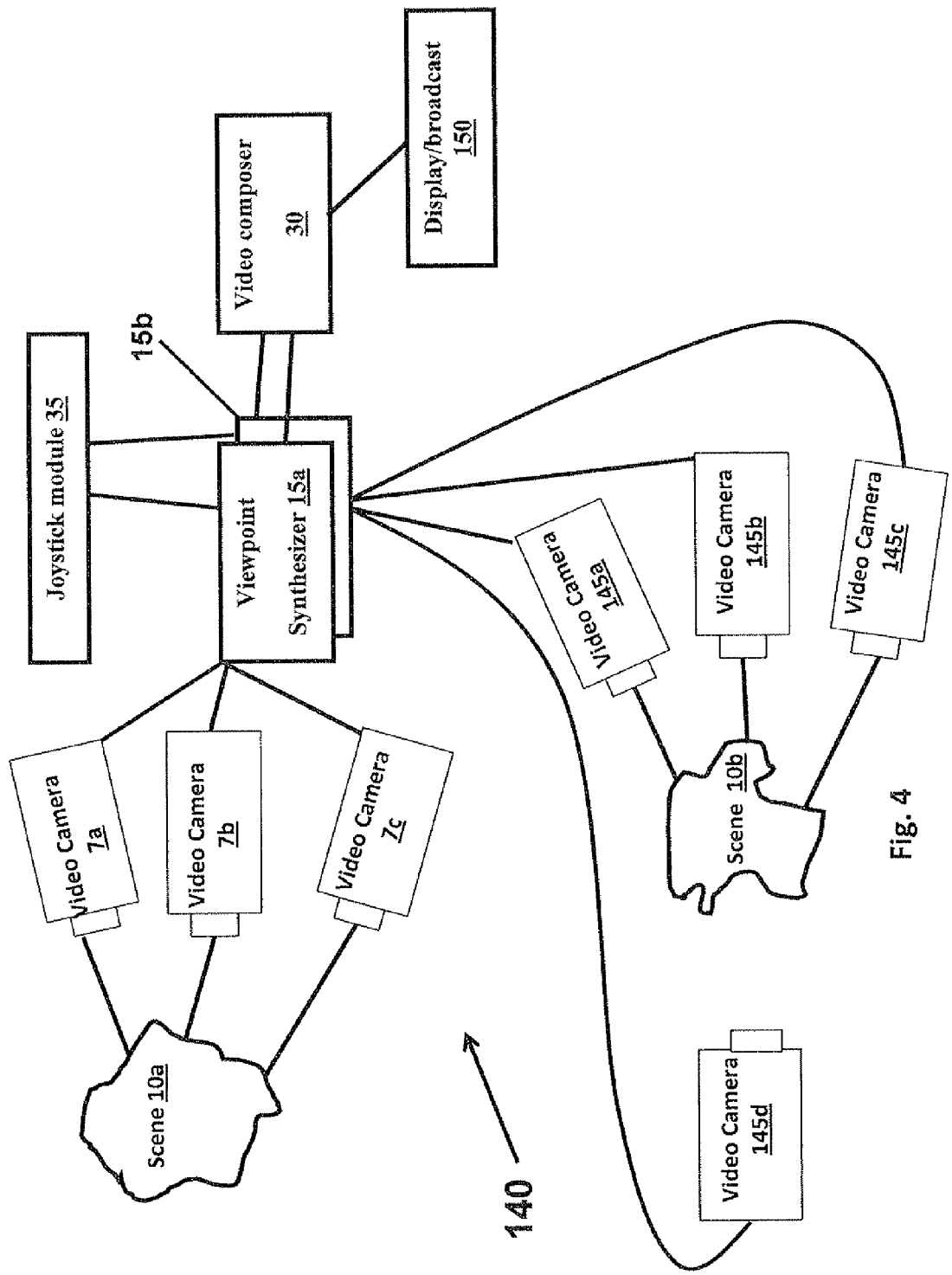
FIG. 4 is a block diagram of a system for converting video streams of two scenes captured by video cameras to video streams associated with a viewpoint configuration.

A Stand Alone Embodiment with Two Sets of Video Cameras (FIG. 4)

System 140 having two sets of video cameras capturing respective scenes 10a and 10b is presented in FIG. 4. Video cameras 7a, 7b and 7c capture scene 10a, and deliver video streams to viewpoint synthesizer 15a, In addition, video cameras 145a, 145b, 145c and 145d capture scene 10b and deliver the video streams to another viewpoint synthesizer 15b as shown in FIG. 4. Alternatively, video cameras 145a, 145b, 145c and 145d deliver their video streams also to synthesizer 15a. In either case, the receiving viewpoint synthesizer converts the video streams to fit a viewpoint configuration which may be the same, slightly different or entirely different for the two sets of video streams. The video composer 30 may integrate the converted video streams of scene 10a and of scene 10b into a single video stream.

A Remote Scene-Local Scene Embodiment (FIGS. 5-8)

Figure 5:
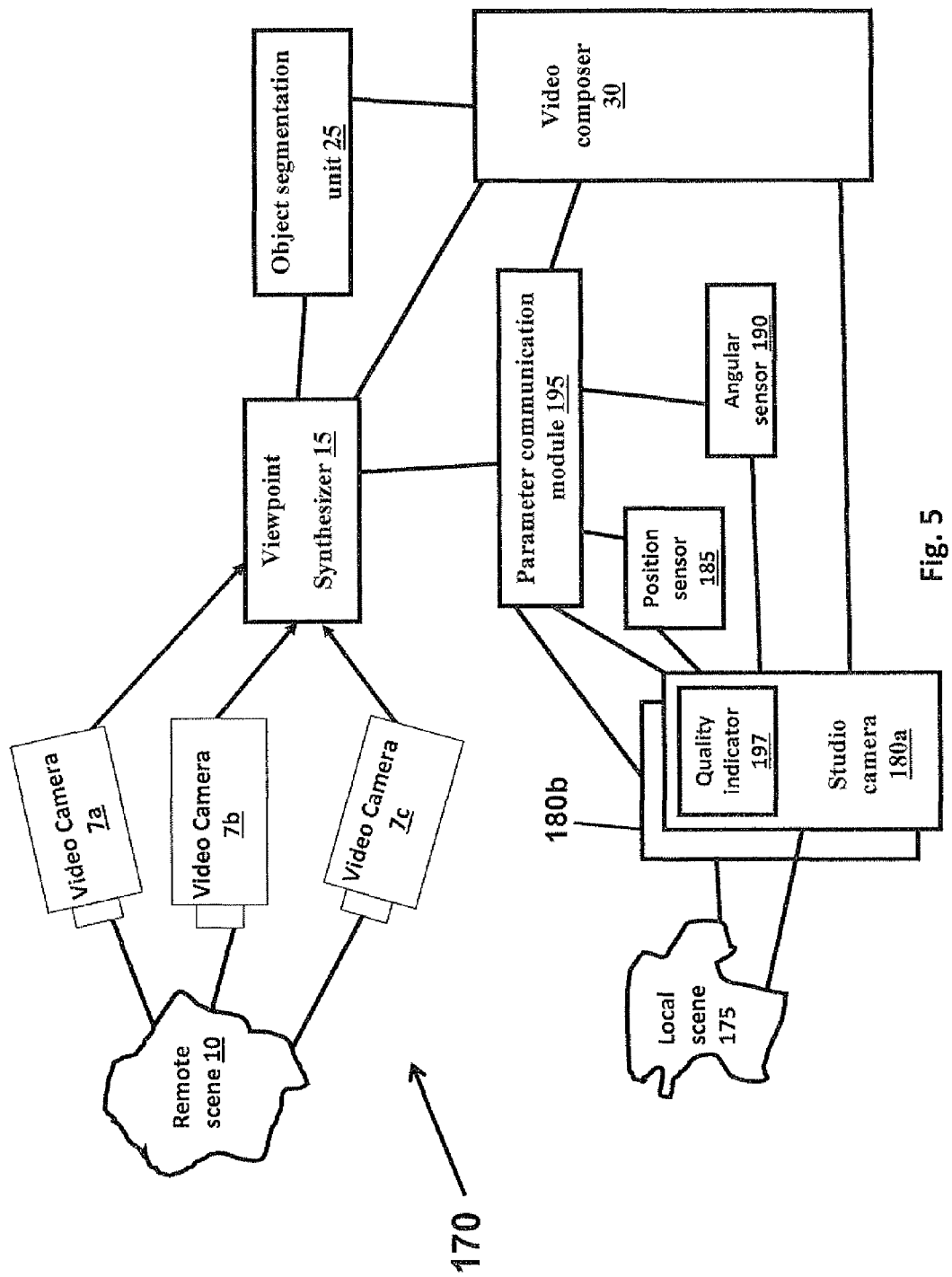
FIG. 5 illustrates a system for embedding an object captured in a remote scene into a video production of a local scene by studio cameras.

A block diagram of system 170 for embedding into a video production of a local scene 175 an object captured in a remote scene 10 is shown in FIG. 5. Video streams which capture the local scene are provided by studio cameras 180a and 180b, each associated with its own viewpoint configuration. Video streams which capture the remote scene 10 are provided by video cameras 7a, 7b and 7c. The system 170 includes a viewpoint synthesizer 15, object segmentation unit 25 for separating at least a portion of the remote scene 10 from other portions thereof, and a video composer 30 for integrating the portion of the remote scene into the video stream of the local scene. The viewpoint synthesizer 15 is adapted for receiving parameters associated with the viewpoint configurations of studio cameras 180a and 180b, and converting video streams of the remote scene 10 to video streams fitting the viewpoint configurations of either one of studio cameras 180a and 180b, as desired.

The viewpoint configurations of studio cameras 180a and 180b may be defined by parameters associated with degree of freedoms, three translation degrees, three rotation degrees and a zoom degree. Some parameters are provided by the studio cameras 180a and 180b, using internal sensors or gauges for example. Other configuration parameters are provided by external sensors which measure the camera state, for example position sensor 185 and angle sensor 190. In one embodiment the parameters are provided directly to the viewpoint synthesizer 15. To reduce the load on synthesizer 15, the parameters may be transferred first to a configuration parameter module 195 which in turn provide in a compact form on a single communication channel to the viewpoint synthesizer 15.

The video cameras 7a, 7b and 7c capturing the second scene 10 may be mapped to the studio cameras 180a and 180b capturing the local scene. For example only, the video streams from cameras 7a and 7b are converted to video streams fitting the viewpoint configuration of studio camera 180a, while video streams from cameras 7b and 7c are converted to video streams fitting the viewpoint configuration of studio camera 180b. Namely, video camera 7b is associated to both studio cameras 180a and 180b. The mapping may be done in advance together with calculations that may relief the computational load on synthesizer 15. The prior mapping and accompanied calculations may be of special importance in live converting of video streams from cameras 7a, 7b and 7c.

In a similar mode, there may be a mapping of certain video cameras to regimes of viewpoint configuration associated with a single studio camera. Moreover, the studio camera may include indicator 197 for indicating the potential quality of the conversion of video streams capturing the remote scene 10 to video streams fitting the viewpoint configuration of the studio camera 180a. For example, the angular range around the local scene is divided to even angular ranges X, Y and Z which are respectively mapped to camera sets (7a,7b,7c,7d), (7e,7f) and 7g, whereas cameras 7a to 7g are unevenly spaced angularly. Thus, whenever the studio camera 180a is in range X, the converting of video streams from the video cameras is expected to yield images of excellent quality and the indicator 197 indicates such an excellent quality. On the other hand, whenever the studio camera 180a is in range Z, only video camera 7g is able to provide video streams convertible to video streams fitting the viewpoint configuration of studio camera 180a. Thus, poor quality images are expected and poor quality is indicated on the indicator 197. Such indication may help the director and photographer to design their moves.

Figure 6:
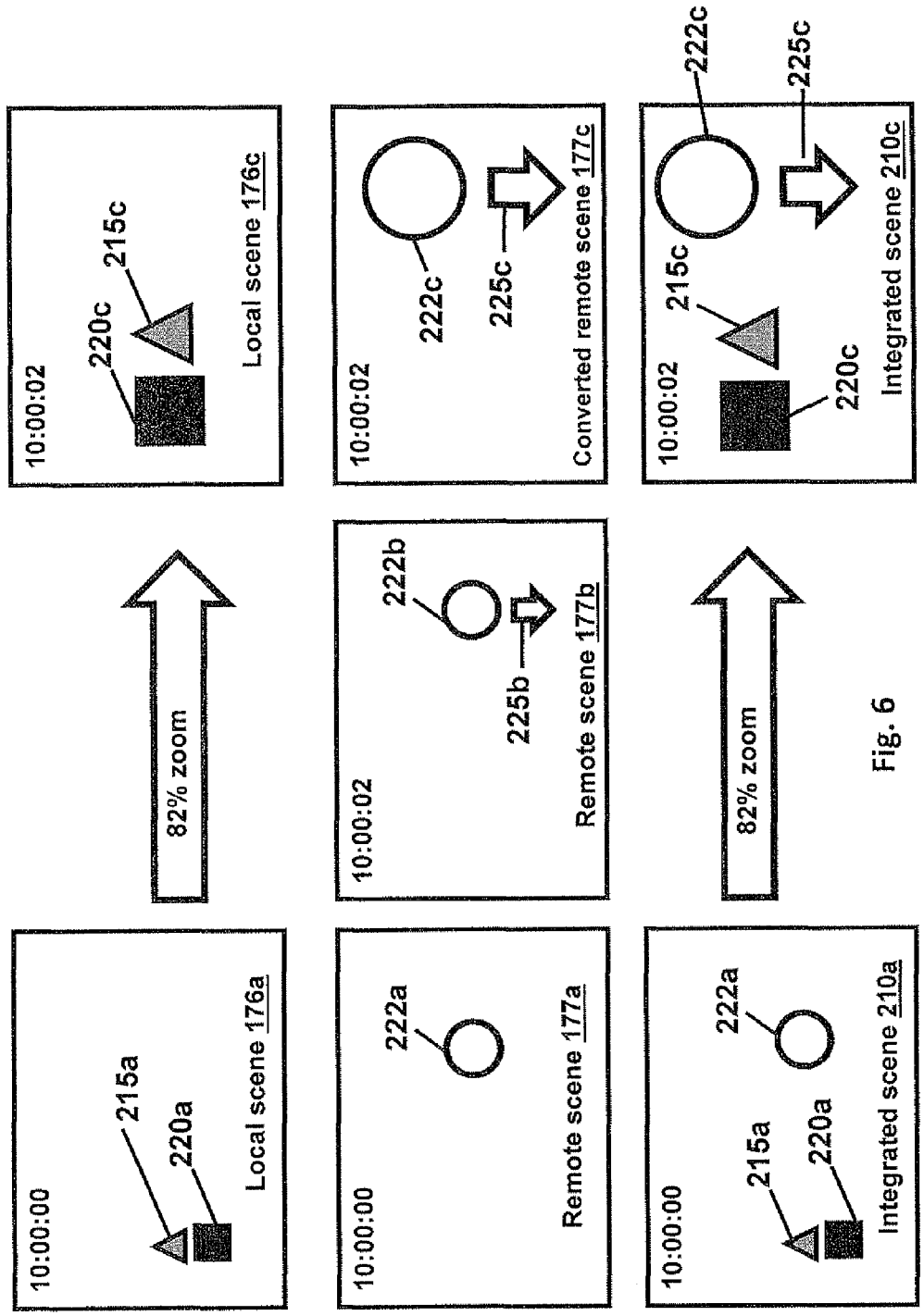
FIG. 6 illustrates conversion of a single frame from the remote scene by zooming it in alike a zoomed frame of the local scene and integrating the two frames.
Figure 7:
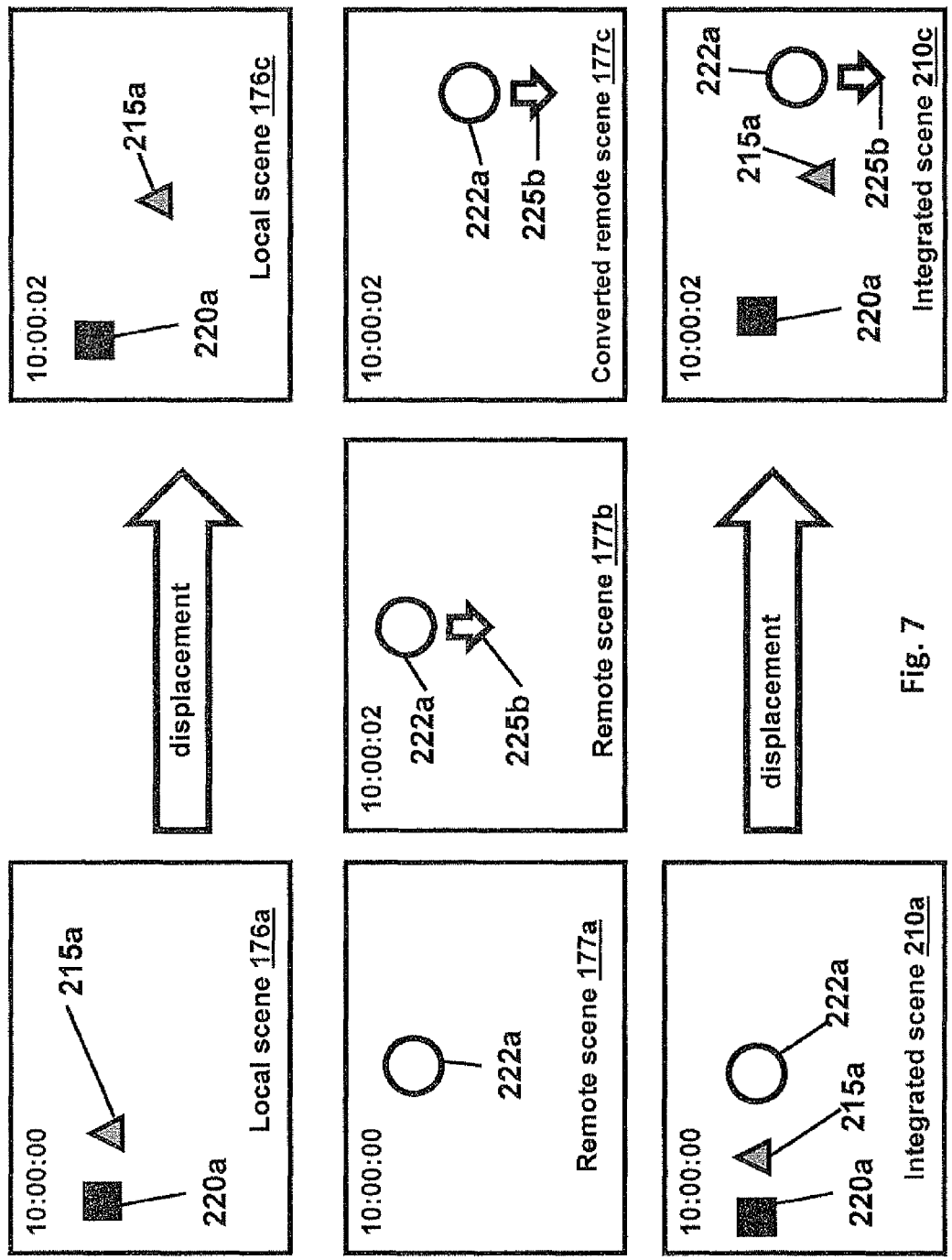
FIG. 7 illustrates conversion of a single frame from the remote scene by displacing the remote object alike a displaced local object and integrating the two frames.

FIGS. 6 and 7 show two examples of the converting of video streams from the video camera 7a to video streams fitting the viewpoint configuration of studio camera 180a. In FIG. 6 the viewpoint configuration of studio camera 180a is changed by 82% zooming in, while in FIG. 7 the change is a displacement of the studio camera 180a. The images in the left column of FIG. 6 show the captured images at 10:00:00 AM. Triangular object 215a and square object 220a are captured at local scene 176a, while circular object 222a is captured in remote scene 177a. The integrated scene 210a show objects 215a, 220a and 222a. At 10:00:02 AM the studio camera 180a is capturing images at 82% zooming in resulting in enlarged objects 215c and 220c as shown in local scene 176c. At the same time the video camera 7a continues to operate without any zooming in and capture an additional object arrow 225b below circular object 222b, as shown in remote scene 177b. To fit the viewpoint configuration of studio camera 180a, the viewpoint synthesizer converts remote scene 177b to converted remote scene 177c with 82% enlarged objects 222c and 225c. Finally, the two images are fed into video composer 30 to get integrated scene 210c with 82% enlarged objects 215c, 220c, 222c and 225c.

Before referring to FIG. 7 it should be noted that sometimes the viewpoint configuration of studio camera 180a includes a varying zoom. The converting of video streams from cameras 7a to 7g to video streams fitting the varying viewpoint configuration is done using one of several methods. A first exemplary method is transition between adjacent video cameras having different zoom values, using the morphing technique. In this example, cameras 7a, 7b and 7c are mounted very close to one another, in term of the distance to scene 10, but having respectively no zoom, ×5 zoom factor and ×10 zoom factor. Once a ×7.5 zoom factor is needed to fit the viewpoint configuration of studio camera 180a, an image from camera 7b is fused using the morphing technique with an image from camera 7c to get an image at ×7.5 zoom factor.

A second method is real zooming of a video camera having a motorized zoom. A third exemplary method is digital zooming in of video streams. For such digital zooming sufficient initial resolution should be ensured using a video camera of high enough resolution. Alternatively, sufficient initial resolution may be ensured by rotating a video camera by 90° angle around optical axis to have a number of pixels in the vertical direction larger than a number of pixels in the horizontal direction. In a typical high definition camera the resolution in the horizontal direction is 1920 pixels, whereas typical resolution in the vertical direction is 1080 pixels. Suppose that an object to be captured in the remote scene is a human object. Then, the field of view of interest in the horizontal direction is much smaller than the desired field of view in the vertical direction, and camera rotation by 90° enhances the available resolution.

Referring now to FIG. 7, square object 220a is used as an anchor in local scene 176a. At 10:00:00 AM the studio camera 180a is positioned such that triangular object 215a seems to be close to anchor object 220a. Circular object 222a is captured in remote scene 177a and the integrated scene 210a show all three objects close to one another. Later, at 10:00:02 AM, the studio camera has changed its viewpoint configuration and thus in local scene 176c object 215a is shown somewhat displaced relative to anchor object 220a. Also at 10:00:02 AM, in remote scene 177b an arrow object 225b appears below object 222a, which has remained in the same place. The viewpoint synthesizer 15 displaces objects 222a and 225b to get converted remote scene 177c with an image which fits the current viewpoint configuration of studio camera 180a. Consequently, the video composer 30 integrate local scene image 176c and the converted remote scene 177c to get integrated scene 210c in which objects 222a and 225b are located proximate to object 215a. Thus, the viewer gets a feeling that objects 222a, 225b and 215a are proximate to one another while they are actually far apart, and that feeling is preserved while the local studio camera has been displaced.

Figure 8:
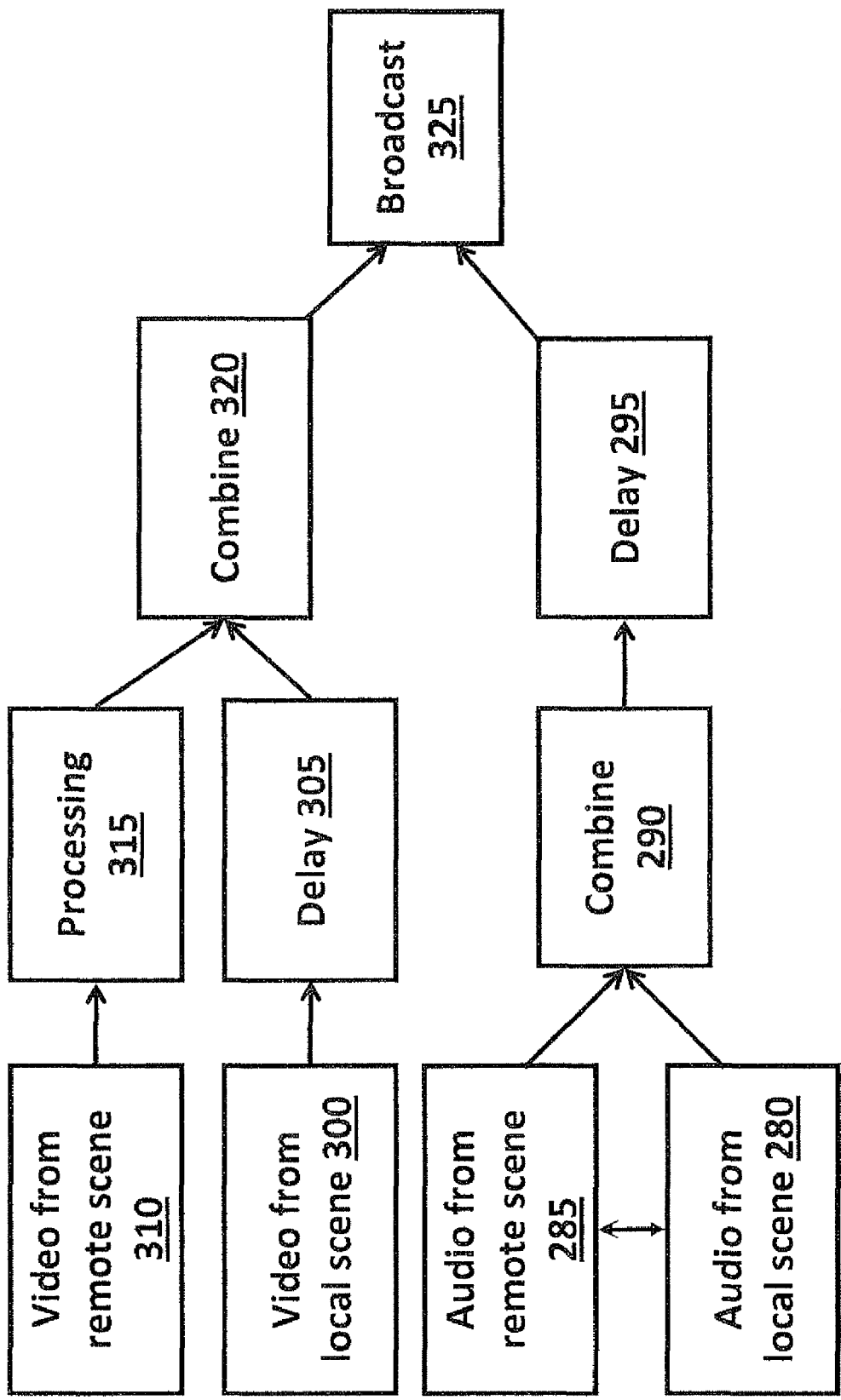
FIG. 8 presents a flow chart of a method for synchronizing video and audio signals from a remote scene and from a local scene.

While the video streams are being processed by the viewpoint synthesizer 15 and video composer 30, the accompanying audio streams should be synchronized to get and keep the feeling of a single scene. The need to synchronize the audio streams stems from several delays in the system. First, in some embodiments the streams from video camera 7a capturing the remote scene 10 are provided via a communication channel which has some delay according to the distance and kind of communication channel. Moreover, video streams and audio streams may be launched through different channels due to the much different desired bandwidth for audio and video signals. Thus, the audio signal or stream from the remote scene may have no delay comparing to the local scene, much alike talking over the phone with someone in another continent through the fiber optic network, rather than through a satellite phone. Secondly, the processing of the video streams as described above may cause appreciable delay. FIG. 8 presents a flow chart of an exemplary method for synchronizing video and audio signals from a remote scene 10 and from a local scene 175 such that the above exemplary delays are compensated for. Thus, audio signal 280 from remote scene 10 is combined with the audio signal 285 from the local scene 175, and the combination 290 is delayed 295 to compensate for the delays in the video channel. The video streams 300 from the local scene 175 are delayed 305 to compensate the processing 310 of the video streams 315 from the remote scene 10, and then the video streams are combined 320 together and may be broadcasted 325 together with the delayed 295 audio signals Thus, the synchronization may ensure a smooth and continuous display of audio and video signals associated with events occurring substantially simultaneously in distant locations.

Figure 9:
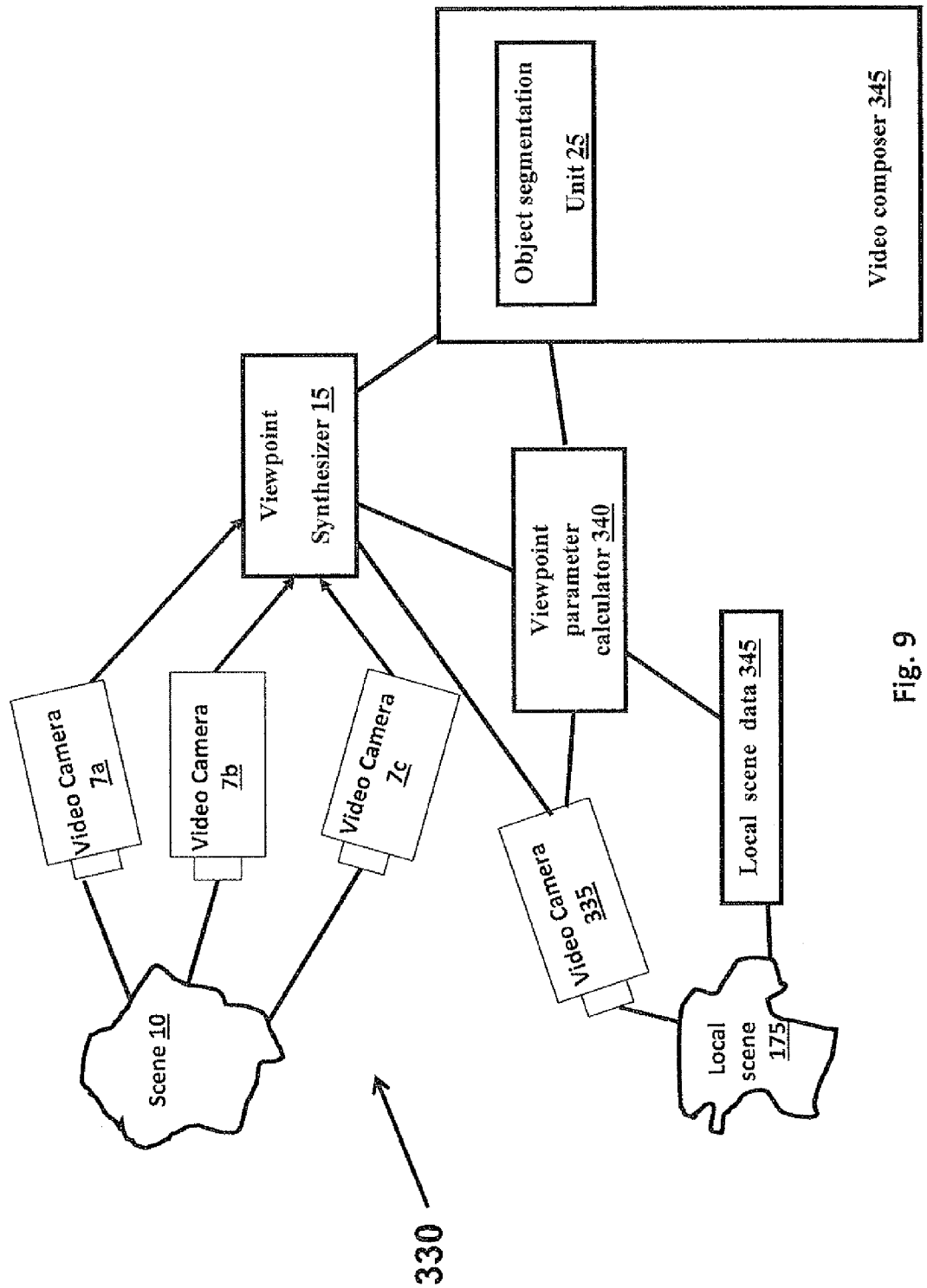
FIG. 9 illustrates a system for embedding an object captured in a remote scene into a video production by a virtual studio camera.

A Virtual Studio Camera Embodiment (FIG. 9)

Rather than a studio camera which has internal sensors probing its viewpoint configuration, one may use a virtual studio camera as shown in FIG. 9. In the system 330 depicted in FIG. 9, a video camera 335 is capturing local scene 175, wherein its operator may change its location, viewing angle, etc, effecting the viewpoint configuration. Data 345 on spatial parameters associated with the local scene 175 is collected in advance and fed into a viewpoint parameter calculator 340. The calculator 340 analyses the video stream captured by video camera 335, derives parameters associated with the viewpoint configuration of video camera 335 and deliver the parameters to viewpoint synthesizer 15, which in turn converts the video streams from cameras 7a, 7b and 7c to video streams fitting the viewpoint configuration of video camera 335. Finally, the converted video streams from synthesizer 15 and the video streams from local scene 175 are integrated in video composer 345. Note that composer 345 include an object segmentation unit 25.

For example, suppose that a celebrity is going to be interviewed sitting near a table behind which the interviewer is sitting, both persons facing the front direction, at least by profile. In a calibration phase, the table dimensions, longitudinal direction and transversal direction are taken together with several shots by video camera 335 at certain viewpoint configurations. The table dimensions may be marked on the shots. Also, internal parameters of video camera 335, like focal point and distortion, are measured. Using the shots, dimensional data on the scene and the known viewpoint configuration, a computational procedure to associate data on the shots with the respective viewpoint configurations is tested and calibrated. Later on, the interview is captured with video camera 335 operated by a photographer. The viewpoint calculator analyses the obtained captured images containing both the celebrity and part of the table, and derives the viewpoint configurations parameters used for capturing the scene, using the calibrated computational procedure. Specifically, during the interview the viewpoint parameter calculator finds in the captured images parts of the table and from their apparent size and relative arrangements it calculates parameters of the viewpoint configuration used to capture the images.

Figure 10:
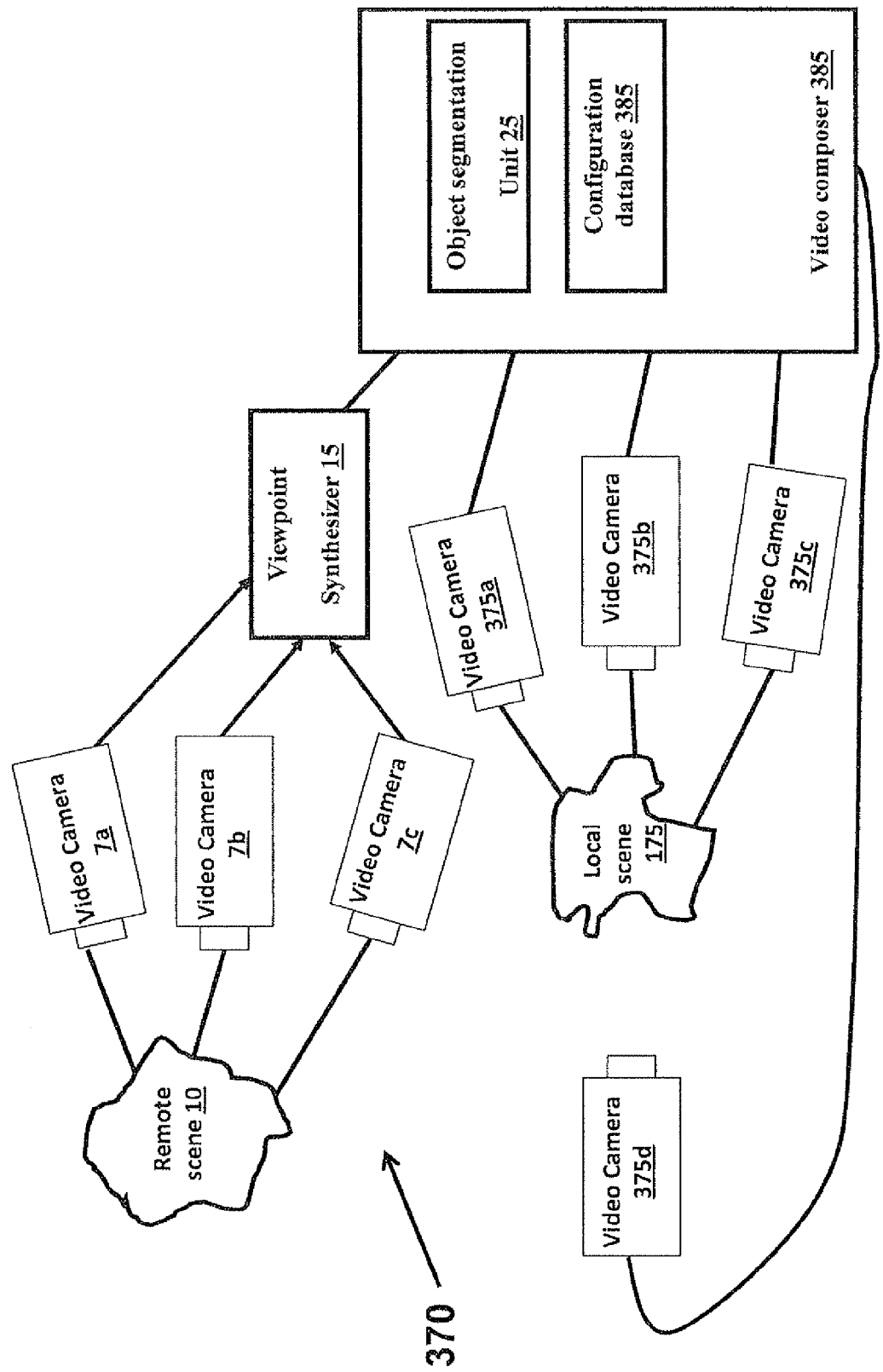
FIG. 10 illustrates a system for embedding an object captured in a remote scene into a video production of a local scene by fixed video cameras.

All Embodiment with a Local Set of Video Cameras (FIG. 10)

System 370 of FIG. 10 presents an embodiment wherein the image provider is a set of video cameras 375a, 375b, 375c and 375d surrounding a local scene 175. In one example, cameras 375a to 375d are fixed cameras and each of them is associated with a viewpoint configuration characterized by certain parameters which are kept in an appropriate configuration database 380 residing in video composer 385 and/or in a viewpoint synthesizer 15 (not shown). For example, at certain time, a director decides to show the local scene 175 as captured by video camera 375b. The parameters of the viewpoint configuration of camera 375b are retrieved from database 385 and submitted to the viewpoint synthesizer 15, which in turn converts video streams from video cameras 7a, 7b and 7c to video streams fitting the viewpoint configuration of video camera 375b. The converted video stream is fed into video composer 385, a desired object is separated from the other portion of remote scene 10 if needed, and integrated into the video stream captured by video camera 375d.

Figure 11:
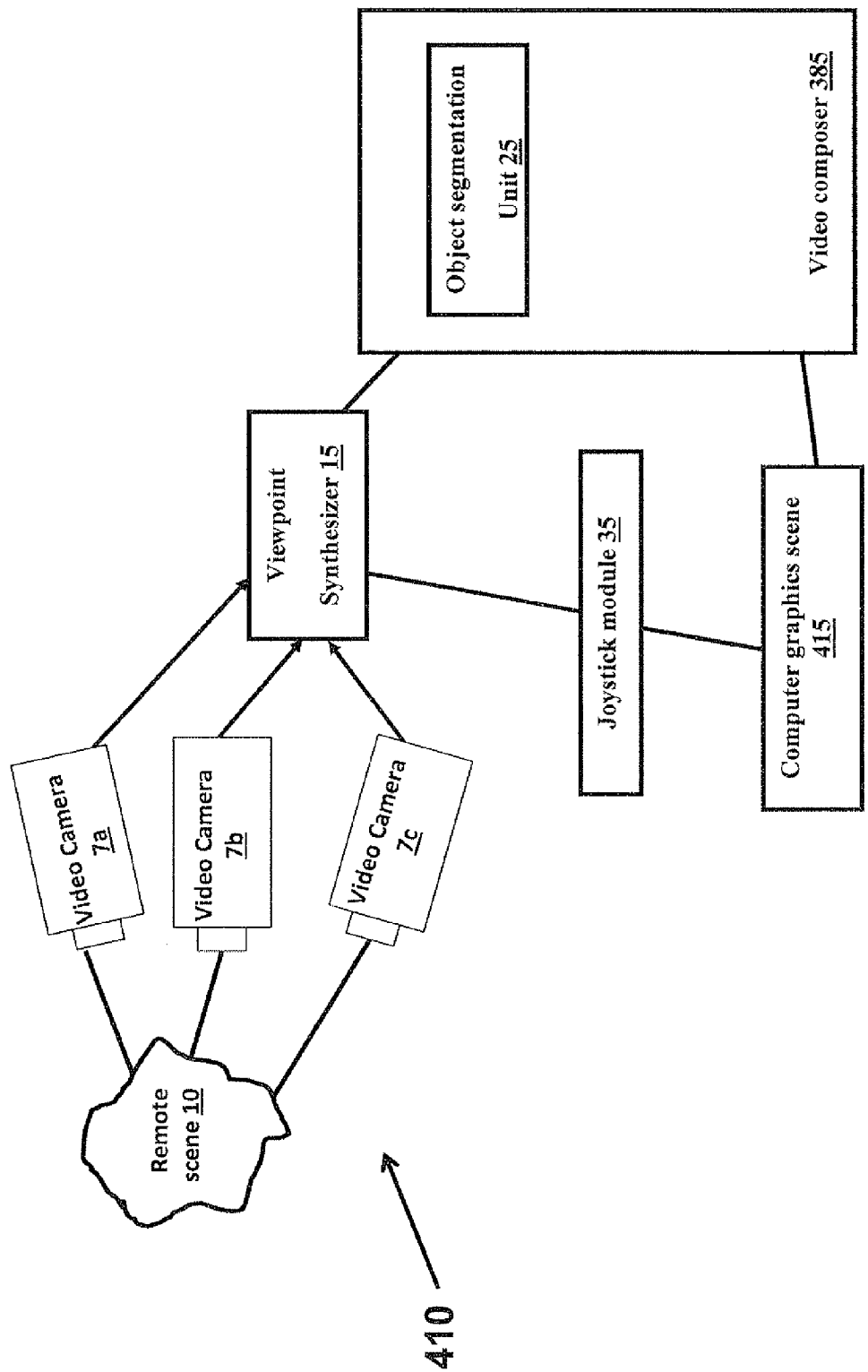
FIG. 11 shows a block diagram of a system for embedding an object captured in a remote scene into a computer graphics scene.

A Computer Graphics Scene Embodiment (FIG. 11)

System 410 of FIG. 11 describes a remote scene 10 to be embedded on a computer graphics scene 415. Scene 415 may be virtually viewed from a variety of viewpoints using several "zoom factors". The decision on the current viewpoint configuration may be done using a joystick module 35 which furnishes both a provider of computer graphics scene 415 and the viewpoint synthesizer 15 with parameters associated with the viewpoint configuration. Thus, the viewpoint synthesizer 15 converts video streams of the remote scene 10 as captured by the video cameras to video streams fitting the viewpoint configuration of the computer graphics scene 415.

Figure 12:
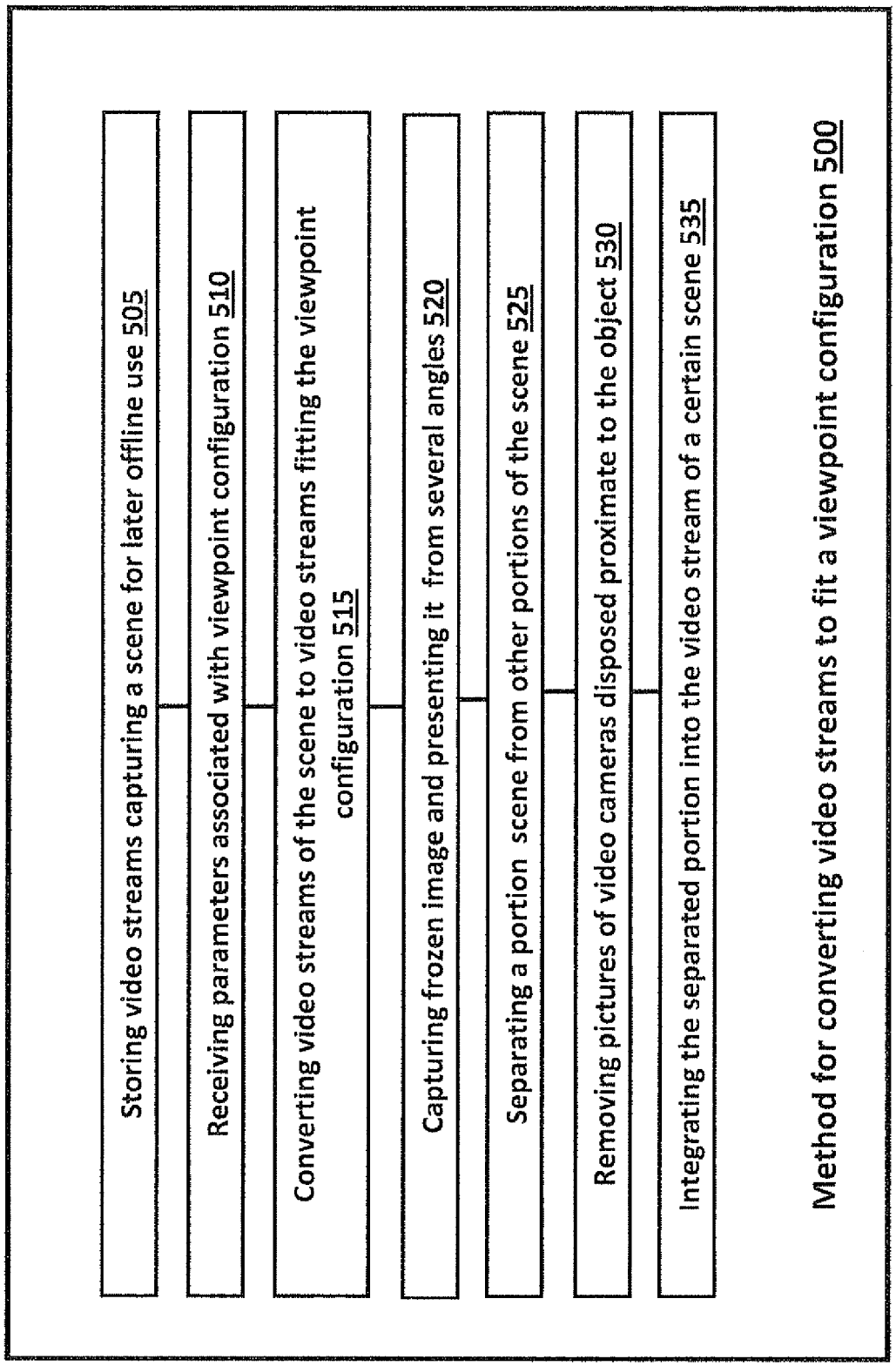
FIG. 12 presents a flow chart of a method for converting video streams of a scene to fit a viewpoint configuration.
Figure 13:
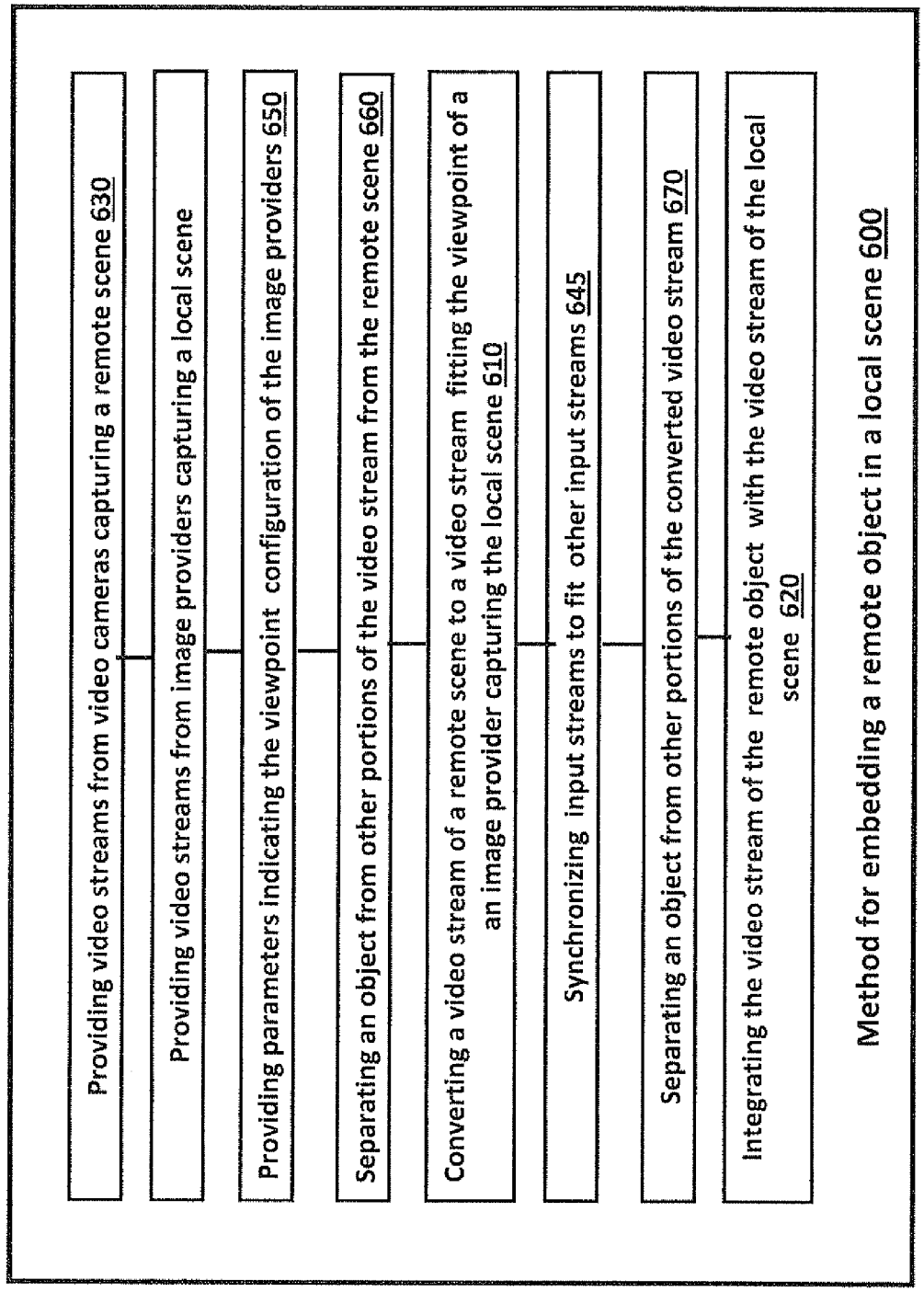
FIG. 13 presents a flow chart of an embodiment of a method for embedding an object captured in a remote scene into a video production of a local scene.

Referring now to method embodiments shown in FIGS. 12 and 13, it is important to note that the steps of each method may be performed in any order or simultaneously, unless it is clear from the context that one step depends on another being performed first.

A Method Embodiment for a Converting Video Streams (FIG. 12)

FIG. 12 depicts a flow chart of a method 500 for converting video streams from cameras 7a, 7b and 7c to video streams fitting a viewpoint configuration. The method includes receiving 510 parameters associated with the viewpoint configuration, and converting 515 video streams of the scene 10 as captured by the video cameras to video streams fitting the viewpoint configuration.

In some embodiments the method includes capturing 520 a substantially frozen image of an object in the scene and presenting the object from two or more viewpoints of different viewing angle.

In some embodiments, the method includes separating 525 at least one object of scene 10 from other portions of scene 10. The separation may be made on the video streams capturing the scene, and then the converting 515 is performed on the separated object only, saving the converting 515 of the other portions. The separating 525 may be made also on the converted video streams. Moreover, the separating 525 may accompanied by removing 530 of pictures of video cameras disposed proximate to the object.

In some embodiments, the method 500 further includes the step of integrating 535 the scene into the video stream of a certain scene associated with the viewpoint configuration.

In some embodiments, the converting 520 is done on video streams which have been captured scene 10 in advance before commencing the converting 520. The video streams captured in advance are stored 505 for later offline use in the converting 515.

The method 500 may also include synchronizing audio streams associated with the scene with video stream associated with the scene, to compensate for the video processing or for any other delay, as shown in FIG. 8 and described here above.

A Method Embodiment for Embodiment Objects Captured in a Remote Scene into a Video Production of a Local Scene (FIG. 13)

FIG. 13 show a flowchart of a method 600 for embedding objects captured in a remote scene 10 into a video production of a local scene 175. The video streams capturing the local scene 175 are provided by image providers associated with viewpoint configurations. Video streams capturing the second scene are being provided by video cameras 7a, 7b and 7c. Method 600 includes converting 610 video streams of the remote scene 10 to video streams fitting the viewpoint configuration of one of the image providers, and integrating 620 portions of the remote scene 10 captured in the converted video stream with portions of the local scene 175. Thus, the method presents portions of the remote scene 10 captured in the converted video stream and objects thereof as integral part of the local scene 175.

The method may include providing 630 video streams from video cameras 7a, 7b and 7c capturing the remote scene 10 via communication channels, and synchronizing 645 signal streams associated with the first scene with signal streams associated with the second scene.

In some embodiments, the method 600 includes providing 650 varying parameters indicating dynamic viewpoint configurations of the image providers The integrating 620 of the first and second scenes may include application of digital video effects.

In some embodiments, the method 600 includes separating 660 at least one object of the scene 10 from other portions of the scene 10. The separation may be made on the video streams capturing the scene, and then the converting 610 is performed on the separated object only, saving the converting 610 of the other portions. The separating 670 may be made on the converted video streams.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. In particular, the present invention is not limited in any way by the examples described.

The invention claimed is:

1. A viewpoint synthesizer for embedding into a video production of a first scene an object captured in a second scene, video streams capturing said first scene being provided by one or more image providers, each image provider being associated with a viewpoint configuration, video streams capturing said second scene being provided by one or more video cameras, the synthesizer adapted for:

(a) receiving one or more parameters associated with the viewpoint configuration of an image provider capturing the first scene; and (b) converting video streams of said second scene as captured by at least one of the video cameras to video streams fitting the viewpoint configuration of said image provider in accordance with the received one or more parameters.

2. The viewpoint synthesizer of claim 1 wherein the synthesizer is linked to means for separating at least a portion of said second scene from other portions of said second scene.

3. The viewpoint synthesizer of claim 1 wherein the synthesizer is linked to means for integrating said at least a portion of said second scene into video streams of said first scene.

4. The viewpoint synthesizer of claim 1 wherein at least one of the image providers is a studio camera associated with a dynamic viewpoint configuration.

5. The viewpoint synthesizer of claim 4 wherein said studio camera includes one or more indicators indicating quality of the conversion of video streams capturing said second scene to video streams fitting the viewpoint configuration of said studio camera.

6. The viewpoint synthesizer of claim 1 wherein at least one of the image providers is a video camera mounted fixedly.

7. The viewpoint synthesizer of claim 1 wherein one or more of the image providers is a provider of computer graphics scene, whereby a joystick module furnishes both said provider and said viewpoint synthesizer one or more parameters associated with a viewpoint configuration, and consequently said viewpoint synthesizer converts video streams of said second scene as captured by at least one of the video cameras to video streams fitting the viewpoint configuration of said computer graphics scene.

8. The viewpoint synthesizer of claim 1 wherein one or more of the image providers is a virtual studio camera comprising a video camera and a calculator of one or more parameters associated with said viewpoint configuration, the calculation being based on prior obtaining of spatial parameters associated with the first scene.

9. The viewpoint synthesizer of claim 1 wherein the second scene is set for facilitating separation of an object located in said second scene from other portions of said second scene using one of chroma keying and luma keying.

10. The viewpoint synthesizer of claim 9 wherein at least two video cameras capturing the second scene have at least one keying parameter having different value for each of said at least two cameras.

11. The viewpoint synthesizer of claim 1 wherein at least two of said video cameras capturing the second scene are arranged for capturing video streams for embedment in video streams captured by certain image provider, whereby the video cameras capturing the second scene are mapped to the image providers capturing the first scene.

12. The viewpoint synthesizer of claim 1 wherein the viewpoint configuration of at least one image provider is defined by at least one parameter associated with at least one degree of freedom of three translation degrees, three rotation degrees and a zoom degree.

13. The viewpoint synthesizer of claim 1 wherein video streams from at least one video camera capturing said second scene are provided via at least one communication channel, and said system further includes means for synchronizing at least one signal stream associated with said first scene with at least one signal stream associated with said second scene;
whereby the signal streams may be either audio or video streams and said synchronizing may ensure a smooth and continuous display of audio and video signals associated with events occurring substantially simultaneously in locations distant from one another.

14. A method for converting video streams capturing a scene to video streams fitting a viewpoint configuration, said video streams being provided by one or more video cameras, the method comprising:

(a) receiving one or more parameters associated with the viewpoint configuration; and (b) converting video streams of said scene as captured by at least one of the video cameras to video streams fitting said viewpoint configuration in accordance with the received one or more parameters.

15. The method of claim 14 wherein said viewpoint configuration is a dynamic viewpoint configuration determined by a joystick module.

16. The method of claim 14 wherein said method includes capturing a substantially frozen image of an object in said scene and presenting said object from two or more viewpoints of different viewing angle.

17. The method of claim 16 wherein said one or more video cameras are mounted to one or more rigs.

18. The method of claim 17 wherein at least one rig is a portable rig.

19. The method of claim 14 wherein said scene is a sport arena.

20. The method of claim 14 wherein said converting includes one of using a billboard technique and using morphing technique to convert video streams of said scene as captured by at least one of the video cameras to video streams fitting a varying viewpoint configuration.

21. The method of claim 14 wherein said converting includes using a three dimensional method to convert video streams of said scene as captured by at least one of the video cameras to video streams fitting a varying viewpoint configuration.

22. The method of claim 14 wherein the method further includes separating at least one object of said scene from other portions of said scene.

23. The method of claim 22 wherein said separating is performed on said video streams capturing said scene, and said converting being performed on the separated object only, thereby saving the converting of said other portions.

24. The method of claim 22 wherein said separating at least one object from other portions of said scene is done on converted video streams.

25. The method of claim 22 wherein said separating includes removing pictures of video cameras disposed proximate to said at least one object.

26. The method of claim 14 wherein the method further includes the step of:

(c) integrating said at least a portion of said scene into the video stream of a certain scene associated with said viewpoint configuration.

27. The method of claim 26 wherein video streams capturing one or more additional scenes are provided by one or more video cameras, and the method further includes the steps of:

(d) converting video streams of said one or more additional scenes to video streams fitting said viewpoint configuration; and (e) integrating at least a portion of each of said one or more additional scenes into the video stream of said certain scene.

28. The method of claim 14 wherein said viewpoint configuration comprises a varying zoom and said converting includes at least one action of a group of actions consisting of:

(i) transition between two or more adjacent video cameras having different zoom values;

(ii) real zooming of a video camera having a motorized zoom; and (iii) digital zooming in of video streams, whereby sufficient initial resolution may be ensured using a video camera of high enough resolution, or by rotating a video camera by substantially right angle around optical axis to have a number of pixels in the vertical direction larger than a number of pixels in the horizontal direction.

29. The method of claim 14 wherein the method includes storing video streams capturing said scene for later offline use in said converting.

30. The method of claim 14 wherein the method further includes the step of synchronizing at least one audio stream associated with said scene with at least one video stream associated with said scene.

31. A method for embedding into a video production of a first scene at least one object captured in a second scene, video streams capturing said first scene being provided by one or more image providers, each image provider being associated with a viewpoint configuration, video streams capturing said second scene being provided by one or more video cameras, the method comprising:
   (a) converting video streams of said second scene from at least one of the video cameras to video streams fitting the viewpoint configuration of one of the image providers; and
   (b) integrating at least a portion of the second scene captured in the converted video stream with at least a portion of the first scene captured in the video streams of said one of the image providers;
   thereby presenting said at least a portion of the second scene captured in the converted video stream and objects thereof as integral part of the first scene.

32. The method of claim 31 wherein the method further includes the step of providing video streams from at least one image provider capturing the first scene.

33. The method of claim 31 wherein the method further includes the steps of:
   (c) providing video streams from at least one video camera capturing said second scene via at least one communication channel; and
   (d) synchronizing at least one signal stream associated with said first scene with at least one signal stream associated with said second scene;
      whereby the signal streams may be either audio or video streams and said synchronizing may ensure a smooth and continuous display of audio and video signals associated with events occurring substantially simultaneously in locations distant from one another.

34. The method of claim 31 wherein the method further includes the step of providing at least one varying parameter indicating a dynamic viewpoint configuration of at least one image provider.

35. The method of claim 31 wherein said integrating of the first and second scenes includes application of at least one digital video effect.

36. The method of claim 31 wherein at least part of said converting and at least part of said integrating is done on video streams which have been captured said second scene in advance before commencing said converting and said integrating,
   whereby the video streams captured in advance are stored for later offline use in said converting and said integrating.

* * * * *